(12) United States Patent
Najafi et al.

(10) Patent No.: US 9,494,425 B2
(45) Date of Patent: Nov. 15, 2016

(54) GYROSCOPE AND METHOD OF FABRICATING A RESONATOR FOR A GYROSCOPE

(75) Inventors: Khalil Najafi, Ann Arbor, MI (US); Jae Yoong Cho, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1158 days.

(21) Appl. No.: 13/481,650

(22) Filed: May 25, 2012

(65) Prior Publication Data
US 2013/0160578 A1 Jun. 27, 2013

Related U.S. Application Data

(60) Provisional application No. 61/490,038, filed on May 25, 2011.

(51) Int. Cl.
G01C 19/00 (2013.01)
G01C 19/28 (2006.01)
G01C 19/5691 (2012.01)

(52) U.S. Cl.
CPC ........... *G01C 19/28* (2013.01); *G01C 19/5691* (2013.01); *Y10T 74/1275* (2015.01)

(58) Field of Classification Search
CPC .......................... G01C 19/5677; G01C 19/28
USPC ....................................................... 73/504.2
See application file for complete search history.

(56) References Cited

U.S. PATENT DOCUMENTS

| 4,793,195 | A | 12/1988 | Koning |
| 4,829,537 | A * | 5/1989 | Baer ............................. 372/66 |
| 4,951,508 | A | 8/1990 | Loper, Jr. et al. |
| 5,801,310 | A | 9/1998 | Matthews et al. |
| 7,040,164 | B2 | 5/2006 | Painter et al. |
| 7,543,496 | B2 | 6/2009 | Ayazi et al. |
| 7,581,443 | B2 | 9/2009 | Kubena et al. |
| 8,631,702 | B2 | 1/2014 | Horning et al. |
| 2007/0017287 | A1 | 1/2007 | Kubena et al. |
| 2007/0220971 | A1 * | 9/2007 | Ayazi et al. ............... 73/504.02 |
| 2008/0094309 | A1 * | 4/2008 | Pance et al. .............. 343/911 R |
| 2009/0301193 | A1 | 12/2009 | Schwartz et al. |
| 2011/0290021 | A1 * | 12/2011 | Horning ............ G01C 19/5691 73/504.13 |
| 2012/0144917 | A1 * | 6/2012 | Painter ....................... 73/504.13 |

OTHER PUBLICATIONS

Chris C. Painter and Andrei M. Shkel, Active Structural Error Suppression in MEMS Rate Integrating Gyroscopes, IEEE Sensors Journal, vol. 3, No. 5, pp. 595-606, Oct. 2003.

D. Lynch, A. Matthews, G.T. Varty, "Innovative Mechanizations to Optimize Inertial Sensors for High or Rate Operations", Symposium Gyro Technology and Exhibition, Stuttgart (Germany), Sep. 16-17, 1997.

(Continued)

*Primary Examiner* — Hezron E Williams
*Assistant Examiner* — Tarun Sinha
(74) *Attorney, Agent, or Firm* — Reising Ethington P.C.

(57) ABSTRACT

A gyroscope having a mechanical resonator, a plurality of electrodes located around the resonator, and a thin gap being located between the resonator and the plurality of electrodes. The resonator is axi-symmetric and may be at least partially toroidal in shape or composed of concentric rings. Piezoelectric electrodes or transduction may be used to drive or detect displacements of the resonator. The resonator may be fabricated using a fused silica flowing process.

17 Claims, 9 Drawing Sheets

(56) References Cited

OTHER PUBLICATIONS

M.W. Putty, "A Micromachined Vibrating Ring Gyroscope", PhD thesis, University of Michigan, 1995.

A. Sharma, M.F. Zaman, and F. Ayazi, "A Sub-0.2 /hr Bias Drift Micromechanical Silicone Gyroscope with Automatic CMOS Mode-Matching", IEEE Journal of Solid-State Circuits, vol. 44, pp. 1593-1608, May 2009.

* cited by examiner

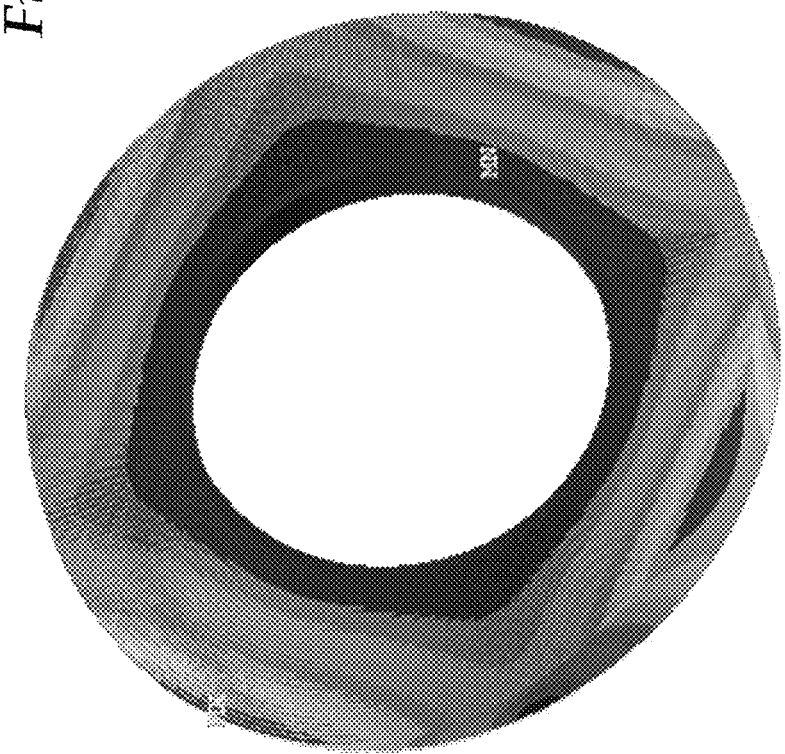

GYROSCOPE AND METHOD OF FABRICATING A RESONATOR FOR A GYROSCOPE

CROSS-REFERENCE TO RELATED APPLICATION

This application claims the benefit of U.S. Provisional Patent Application No. 61/490,038 filed May 25, 2011, the entire contents of which are hereby incorporated by reference.

STATEMENT REGARDING FEDERALLY-SPONSORED RESEARCH

This invention was made with government support under W31P4Q-04-1-R001 awarded by the U.S. Army Aviation and Missile Command. The government has certain rights in the invention.

TECHNICAL FIELD

The present invention generally relates to gyroscopes and, more particularly, to rate gyroscopes (RGs) and rate-integrating gyroscopes (RIGs).

BACKGROUND OF THE INVENTION

An increasing number of navigational applications require gyroscopes for precise position tracking, particularly gyroscopes that are smaller and more accurate. Some examples of such navigational applications include surveillance robots, unmanned ground vehicles, and unmanned aerial vehicles (UAVs), many of which are related to homeland security or the military. These applications may need to calculate a position solely from measurements made by gyroscopes and accelerometers in environments where GPS information is limited or corrupted.

SUMMARY

In accordance with one aspect of the invention, there is provided a gyroscope having a resonator, a plurality of electrodes being located around the resonator, and a thin gap being located between the resonator and the plurality of electrodes, wherein the resonator is axi-symmetric and is at least partially toroidal in shape.

In accordance with another aspect of the invention, there is provided a gyroscope having a resonator, a plurality of electrodes being located around the resonator, and a thin gap being located between the resonator and the plurality of electrodes, wherein the resonator is axi-symmetric and includes a plurality of concentric rings.

In accordance with yet another aspect of the invention, there is provided a gyroscope having a resonator and a plurality of electrodes including at least one piezoelectric electrode, wherein the resonator is axi-symmetric and wherein the one or more piezoelectric electrodes transmit vibratory motion to the resonator, receive vibratory motion from the resonator, or both.

In accordance with another aspect of the invention, there is provided a method for fabricating a resonator for a gyroscope, comprising the step of fabricating a gyroscope resonator using a fused silica flowing process.

BRIEF DESCRIPTION OF THE DRAWINGS

One or more preferred exemplary embodiments of the invention will hereinafter be described in conjunction with the appended drawings, wherein like designations denote like elements, and wherein:

FIGS. 7a and 7b are plots of simulated displacement patterns for two wineglass modes of the cylindrical gyroscope of FIG. 4.

DETAILED DESCRIPTION OF THE ILLUSTRATED EMBODIMENTS

Figure 1:
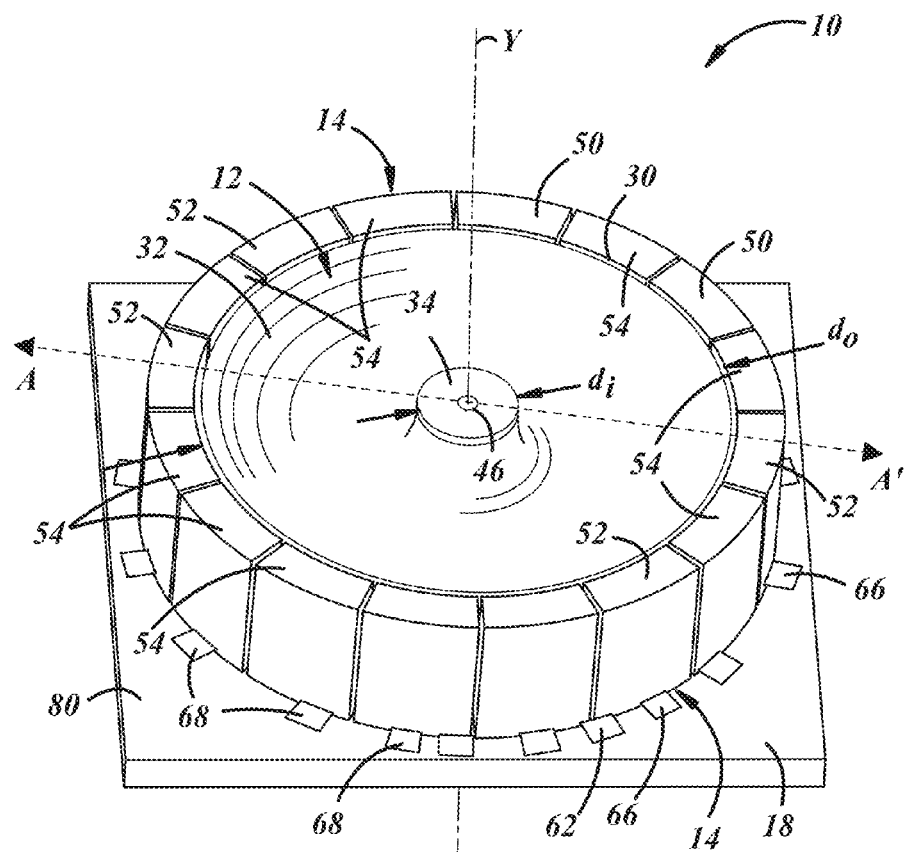
FIG. 1 is a perspective diagrammatic view of a half-toroid rate-integrating gyroscope constructed in accordance with an embodiment of the invention.

Gyroscopes have been around since the early 19$^{th}$ century, and since then they have been used in various military and navigational applications. Generally speaking, gyroscopes can be categorized into rate gyroscopes (RGs), which compute rotation rates, and rate-integrating gyroscopes (RIGs), which compute rotation angles. Although there are some micro-scale RGs, most RIGs are meso-scale. The gyroscope discussed herein may be an RG or an RIG and it may be provided according to a number of different embodiments and designs, including the various exemplary embodiments described below.

For the last two decades, a great deal of research has focused on developing micro-gyroscopes that are mechanical and miniaturized using micro-machining technologies. The accuracy of some micro-gyroscopes has now reached the level required by near-inertial-grade applications. The exemplary gyroscopes described herein can be micro-fabricated on a commercial scale. Moreover, these gyroscopes may be used in a number of different applications, including personal electronics, automotive systems, aerospace systems, missile guidance systems, platform stabilization systems, surveillance robots, and unmanned ground vehicles and unmanned aerial vehicles (UAVs), to cite just a few.

Toroidal Embodiment

According to one embodiment, gyroscope 10 is a precision rate-integrating shell micro-gyroscope (PRISM) and includes a resonator 12, a plurality of outer electrodes 14 (e.g., discrete pickup, drive and control electrodes), an inner electrode 16, a substrate 18, and a support post 20.

Figure 2:
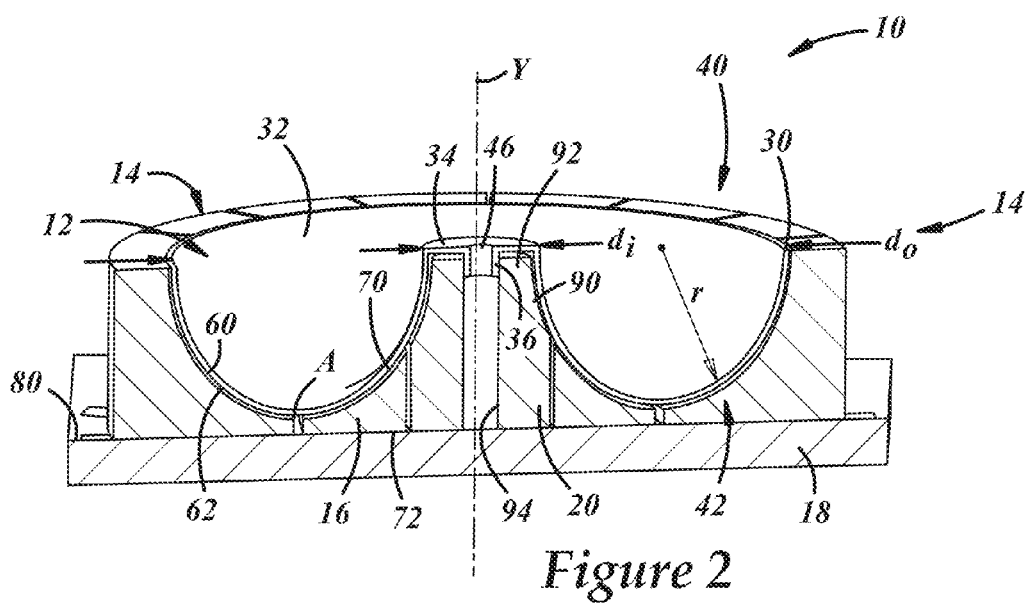
FIG. 2 is a cross-sectional diagrammatic view of the half-toroid gyroscope taken along the A-A' line of FIG. 1.

Resonator 12 is a resonant structure or mass within the gyroscope that vibrates in response to electrostatic excitations. In this particular embodiment, resonator 12 is an axi-symmetric vibrating mass that is symmetrical about a single axis Y and has a shape that somewhat resembles the top of a birdbath or half of a donut. In more specific geometric terms, resonator 12 may be defined at least in part by a "toroid" shape, which refers to a surface that is formed by revolving a closed curve about an axis that is in the same plane as the closed curve. There are different types of toroids, including one called a torus that is formed by revolving a circle about an axis located in the same plane as the circle; likewise, there are different types of toruses or tori, including ones called a ring torus, a horn torus, and a spindle torus. The exemplary resonator 12 shown in FIGS. 1 and 2 is in the shape of a half ring torus (i.e., the lower half of a ring torus), but it could have any type of toroidal shape. The term "toroidal," as used herein, broadly includes any shape that is at least partially defined by a toroid, including toroids that are a torus (formed by revolving a circle around an axis) and those that are a non-torus (formed by revolving some other closed curve around an axis). In this particular embodiment, resonator 12 is axi-symmetric and has a surface formed by revolving an imaginary half circle about the Y axis (best illustrated in FIG. 2), where the half circle has a radius r (e.g., 0.5 mm), and the resonator has an inner diameter $d_i$ (e.g., 0.1 mm) and an outer diameter $d_o$ (e.g., 1.5 mm). Skilled artisans will appreciate that a ring torus has an inner diameter $d_i$ that is greater than zero, a horn torus has an inner diameter $d_i$ that is zero, and a spindle torus has an inner diameter $d_i$ that is less than zero (e.g., overlapping circles).

The resonator is also referred to as a suspended mass or shell and may be constructed from a number of different materials, including fused silica. Some suitable materials that may be used include conductive materials and non-conductive high-Q materials that have a thin layer of conductive material coated on the surface, to cite a few examples. By having an axi-symmetric shape, flexural modes of resonator 12 may have an equal quality factor (Q) and frequency (f). When resonator 12 is designed correctly, the flexural modes tend to have a higher quality factor (Q) and a lower frequency (f). According to the exemplary embodiment shown here, resonator 12 is separated from outer electrodes 14 through a small annular space or gap 30 (e.g., less than about 15 micrometers (μm)) and the resonator includes an annular channel 32, a center portion 34, and an anchor portion 36. Annular space 30 is preferably uniform all around so that an equal driving or electrostatic force may be applied to resonator 12.

Annular channel 32 is an exposed channel or groove that annularly extends around resonator 12 and is open on a first axial side 40 opposite substrate 18 (i.e., an upper side) and is closed on a second axial side 42 adjacent the substrate (i.e., a lower side). Although it is possible for annular channel 32 to be enclosed (i.e., defined by a full toroid instead of a partial one), the exposed or open channel configuration shown in FIGS. 1 and 2 provides resonator 12 with a lower shell stiffness, which is generally a desirable attribute for resonators. Annular channel 32 is not limited to a semi-circular cross-sectional shape; the annular channel could instead have an elliptical, parabolic or other suitable cross-sectional shape, so long as the resonator remains axi-symmetric.

Center portion 34 is located at the center of the resonator 12 and provides an axi-symmetric anchor for attaching the resonator to substrate 18. According to the exemplary embodiment shown here, center portion 34 is a flat circular surface that connects the inner sidewalls of annular channel 32 together and includes an opening 46. Of course, center portion 34 could be concave, convex or some other non-planar surface, so long as it maintains an axi-symmetric configuration. Opening 46 may extend all the way through center portion 34 and helps define anchor portion 36, as will be explained. Center portion 34 is positioned in FIG. 2 at the top of the inner sidewall of annular channel 32, however, the center position may be raised or lowered along the Y axis from this exemplary position.

Anchor portion 36 is formed on the underside of resonator 12 and is designed to interact with support post 20 so that the resonator or shell can be maintained in a suspended position over top of the various electrodes. Generally, the electrodes may be located anywhere so long as they can form a capacitor with the shell and used to drive the shell into resonance. For example, the electrodes could be located on the inside of the shell if a different fabrication approach is used. In the particular embodiment shown, anchor portion 36 is an annular cup that is defined by the inner sidewalls of annular channel 32, center portion 34 and opening 46, and is designed to rest on top of support post 20. The interaction between anchor portion 36 and support post 20 creates an axi-symmetrical and secure mount for the resonator and helps ensure proper performance of the gyroscope in the various flexural modes. Annular channel 32, center portion 34 and anchor portion 36 may be integrally formed into a single resonator body—and thus electrically connected with each other—such that they are all coaxial about axis Y. Other configurations and features may be used for attaching resonator 12 to substrate 18, as the gyroscope is not limited to the specific anchor portion embodiment shown here.

Outer electrodes 14 electrostatically interact with resonator 12 so that vibrations within the resonator can be both induced and evaluated. According to the exemplary embodiment shown in FIGS. 1 and 2, outer electrodes 14 include a number of discrete electrode components that are generally arranged around the outer (or the inner) circumference of resonator 12. The discrete electrode components may include one or more drive electrodes 50, pickup electrodes 52 and/or control electrodes 54. As is understood by those skilled in the art, drive electrodes 50 are used to electrostatically drive or excite resonator 12, pickup electrodes 52 are used to measure or evaluate the corresponding vibrations in the resonator, and control electrodes 54 are used to actively manage or electrically tune the flexural modes in the resonator (e.g., cancel the quadrature component of the vibration pattern, tune mismatches in frequencies and quality factors, etc.). In this particular embodiment, there are sixteen discrete outer electrodes arranged around the outer circumference of resonator 12 in 22.5° increments; different numbers of electrode components and different angular increments may be used instead. It should be appreciated that the various outer electrodes 14 may be operated as a drive electrode, a pickup electrode or as a control electrode, depending on the particular mode of operation (e.g., a rate gyroscope (RG) mode or a rate-integrating gyroscope (RIG) mode). To illustrate, FIG. 1 shows a pair of outer electrodes being used as drive electrodes 50 (each pair separated by 45°), two pairs of outer electrodes being used as pick-up electrodes 52 (each pair separated by 45°, the two pairs separated by 180°), and the rest of the outer electrodes being used as control electrodes 54. The drive electrode pairs and the pickup electrode pairs may be 90°, 180°, 270° apart, etc. This particular arrangement of outer electrodes 14 is particularly well suited for operating gyroscope 10 in a RIG mode, but a different arrangement would likely be used if the gyroscope is operated in a RG mode. Gyroscope 10 is not limited to any one combination or arrangement of outer electrodes, as numerous embodiments involving drive, pickup and/or control electrodes are possible.

The outer electrodes are designed to electrostatically interact with resonator 12 across thin gap 30, much in the same way as components of a parallel-plate capacitor. In order to achieve the desired electrostatic interaction, each of the outer electrodes 14 may have an upper surface 60 that opposes and complements the shape of resonator 12, and a lower surface 62 that faces substrate 18. According to this particular embodiment, upper surface 60 is curved or concaved and is separated from a lower surface of annular channel 32 via the thin annular space 30, as already explained. The upper surface 60 may extend from near a midpoint A of annular channel 32 to an outer circumference of the channel; however, the exact shape, size and other attributes of outer electrodes 14 are not limited to the examples provided here. Lower surface 62 may be flat or planar so that it can securely rest upon an upper surface of substrate 18. The drive, pickup, and control electrodes may be fabricated individually, they may be made from a single substrate (e.g., the same substrate as the resonator or a different substrate), or they may be made using bottom electrodes, to cite a few possibilities. The outer electrodes 14 may be electrically connected to a number of electrical leads on substrate 18, including drive leads (not shown), pickup leads 66 and control leads 68. Other leads may also be provided for inner electrode 20 and/or resonator 12, such as lead 62 which is located in between adjacent discrete outer electrodes 14. Of course, other lead or connector arrangements may be used instead, as gyroscope 10 is not limited to the specific examples disclosed herein.

Inner electrode 16 is optional and may be used to periodically actuate or excite resonator 12 in all radial directions. According to this exemplary embodiment, inner electrode 16 is generally annular in shape and is a single continuous component instead of being comprised of a number of discrete electrodes, like outer electrodes 14. Inner electrode 16, also referred to as a ring electrode, is coaxial with axis A and has an upper surface 70 that is curved and complements the shape of resonator 12 and a lower surface 72 that is flat and rests on substrate 18. In the present example, the upper surfaces 60 and 70 cooperate with one another to form an annular nest that is concave and opposes the underside of annular channel 32. The curved upper surface 70 opposes the resonator across the thin annular gap 30, as already explained, and extends from the inner circumference of the resonator to a midpoint A in annular channel 32. The inner electrode 16 may be electrically connected to one or more electrical leads 62 that are disposed on substrate 18. The ring electrode 16 may excite both degenerate flexural modes of resonator 12 using AC voltage. As mentioned above, inner electrode or ring electrode 16 is optional and may be omitted from some embodiments; it is also possible to provide an additional ring electrode.

Substrate 18 is preferably made from an insulating material or has an insulating layer on its surface, and provides a base for supporting the different components of gyroscope 10. Substrate 18 may be square, as it is shown in FIGS. 1 and 2, or be provided according to some other shape. Substrate 18 is not limited to any exact shape, thickness, material, etc., and may have various electrical leads or conductors formed on its surface. For instance, any combination of leads 62, 64, 66, 68 may be soldered, patterned or otherwise formed on an upper surface 80 of the substrate or extend in feedthroughs that pass through the substrate. Substrate 18 and one or more of the electrodes may be bonded to each other at the wafer level.

Support post 20 is designed to support or hold up resonator 12 so that the resonator is maintained in a somewhat suspended state above the outer and inner electrodes 14, 16. In this particular embodiment, support post 20 is a generally tubular post that is coaxial with axis Y and supports resonator 12 at anchor portion 36. More specifically, the exemplary support post is shown here including a curved upper surface 90, an attachment portion 92, and an axial bore 94. Curved upper surface 90 is shaped and sized to complement an underside of annular channel 32 and tapers the upper end of the support post so that attachment portion 92 fits within the annular cup formed by anchor portion 36. Axial bore 94 extends the length of the support post and may act as a passageway for a lead or other conductor to resonator 12. This is not the only potential configuration for support post 20, as other embodiments could certainly be used.

Initial testing suggests that gyroscope 10 exhibits qualities that are desirable from both a fabrication perspective and an operational perspective. For example, the exemplary resonator 12 may be easier or simpler to micro-machine than other resonant shells, thus, better lending the resonator to batch-mode commercial manufacturing processes. Resonator 12 also performs well from an operational perspective, as it may have a high quality factor (Q), reduced energy losses, low damping mismatch, low frequency mismatch in the different flexural modes, a large dynamic range (e.g., from 100s to 10,000s of degrees/second), and minimum drift due to external vibrations, to cite a few possibilities. The preceding examples represent only some of the potential advantages and attributes of the exemplary gyroscope 10, as they are not mandatory nor are they exclusive. Some design considerations that may be taken into account include resonator dimensions and stiffness, as they can affect the performance of the gyroscope. The amount of electrostatic force is impacted by the size of the capacitor (i.e., the area of resonator 12 and electrodes 14, 16) and the gap between the electrodes and the resonator. Thus, the stiffer the resonator or shell, the larger the capacitor generally needs to be in order to get vibrate properly.

Figure 3A:
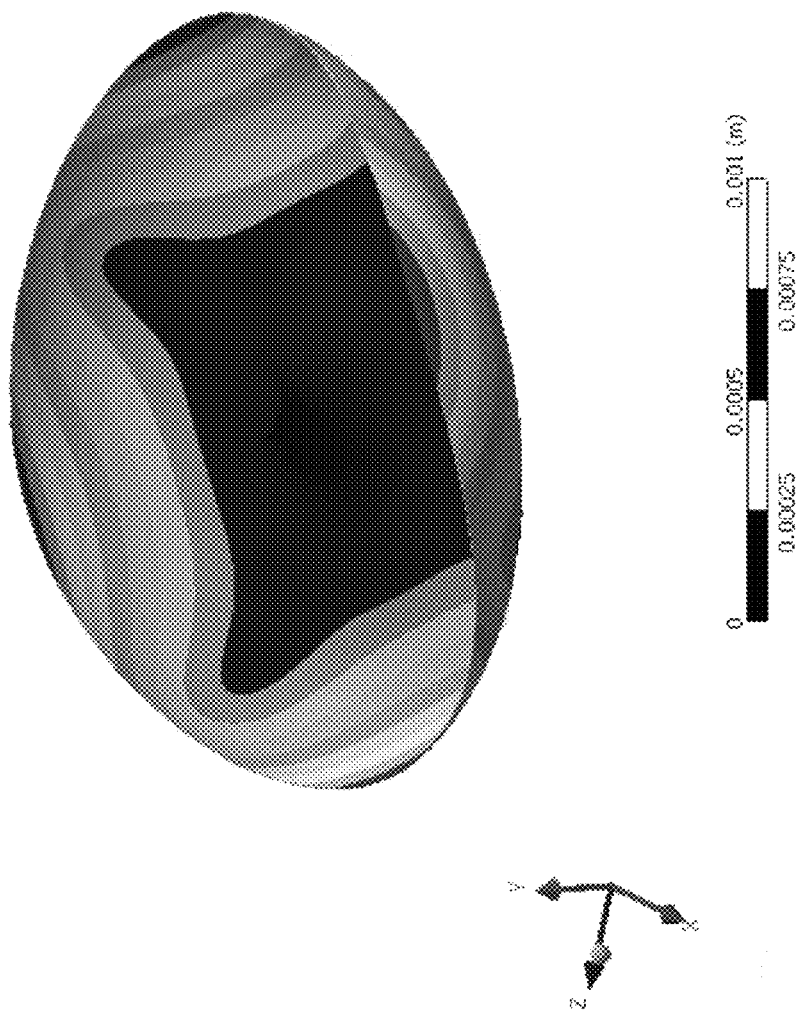
FIGS. 3a and 3b are plots of simulated flexural wave patterns for two wineglass modes of the half-toroid gyroscope of FIG. 1.
Figure 3B:
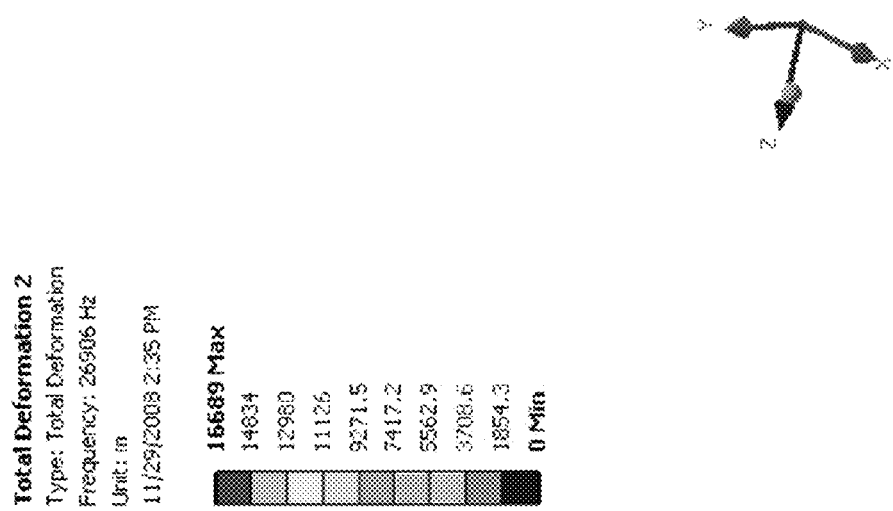

During operation, drive electrodes 50 are used to actuate or excite resonator 12 so that the resonator may vibrate and operate in a whole angle mode where the amplitude of the vibrations are maintained constant. As the gyroscope is rotated, the position of the antinodes of a flexural wave pattern is detected by pickup electrodes 52. As understood by skilled artisans, the flexural wave pattern may be a linear summation of the patterns of two fundamental flexural modes. The two flexural modes can have identical flexural wave or vibration patterns with respect to their fundamental axes, which are separated by 45°. Examples of flexural wave patterns of two flexural modes are shown in FIGS. 3a and 3b, with contour patterns indicating the amount of displacement. The angle of rotation is derived from output of pickup electrodes 52; more specifically, from the precession of its vibration pattern caused by free transfer of energies between the two principal axes under rotation, under the Coriolis force. The discrete control electrodes 54 may be used to cancel quadrature signals and to match the frequencies of the two flexural modes. The flexural modes may be located at the lowest order, and are preferably higher apart than the parasitic resonance modes. These resonance characteristics may enable gyroscope 10 to operate at a resonator frequency that is less than 100 kHz and to be controlled or maintained in a more stable fashion. Although the preceding description may be from the perspective of a gyroscope being operating in a rate-integrating gyroscope (RIG) mode, the gyroscope may be operated in a rate gyroscope (RG) mode as well.

From Finite Element Method (FEM) simulation, the frequencies of a wineglass mode in FIGS. 3a and 3b are found at the lowest order (e.g., below 30 kHz). They are placed in this range so that the amount of coupling between the environment and the resonator is small, yet allow the resonator to be soft enough to vibrate with large amplitude. Gyroscope 10 may also have fundamental flexural modes at low frequencies. The shapes of the gyroscope's resonator, electrodes, and support post may be definable with a single masking step.

Multi Cylinder Embodiment

Figure 4:
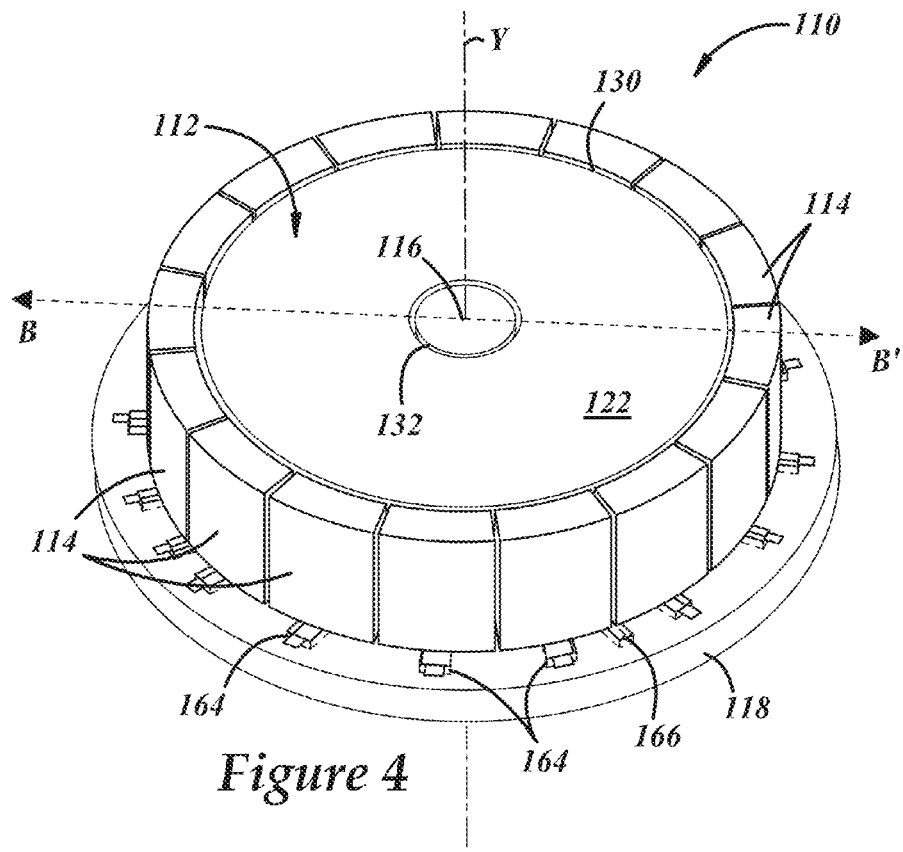
FIG. 4 is a perspective diagrammatic view of a cylindrical rate-integrating gyroscope constructed in accordance with another embodiment of the invention.
Figure 5:
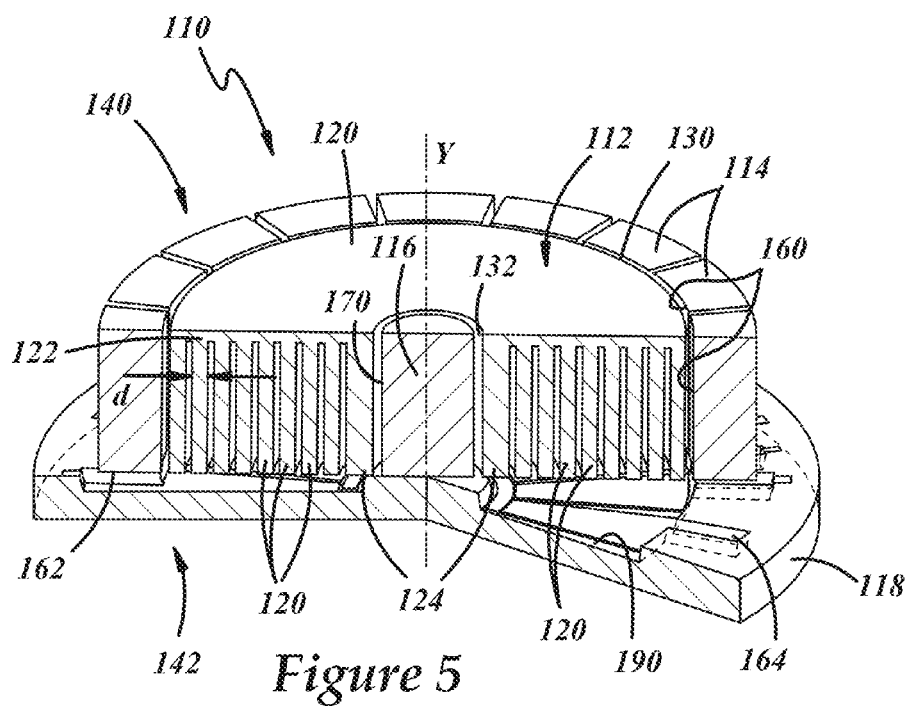
FIG. 5 is a cross-sectional diagrammatic view of the cylindrical gyroscope taken along the B-B' line of FIG. 4.

According to a different embodiment shown in FIGS. 4 and 5, gyroscope 110 includes a resonator 112, a plurality of outer electrodes 114 (e.g., discrete pickup, drive and control electrodes), an inner electrode 116, and a substrate 118. Like the previous toroidal embodiment, gyroscope 110 may also be a precision rate-integrating shell microgyroscope (PRISM).

Resonator 112 is a resonant structure or mass that vibrates in response to electrostatic excitations. In this particular embodiment, resonator 112 is located between outer electrodes 114 and inner electrode 116 and is separated from the outer and inner electrodes by thin annular gaps 130, 132, respectively. One or both of these gaps may have dimensions on the order of several microns (e.g., 5-15 μm), depending on the micro-fabrication process. The exemplary resonator 112 shown here includes a number of concentric rings 120, a connecting portion 122, and an anchor portion 124.

As their name suggests, the plurality of concentric rings 120 are concentric with one another so that resonator 112 is axi-symmetric about the Y axis. The different concentric rings 120 may be uniform in thickness d and may extend nearly the entire axial extent of resonator 112. In the embodiment illustrated in FIG. 5, the concentric rings 120 are physically connected with each other by a connecting portion 122 located near a first or upper axial end 140 of the resonator, and the concentric rings are open or exposed at a second or lower axial end 142. Upper axial end 140 is located opposite substrate 118, while lower axial end 142 is located adjacent the substrate. Connecting portion 122 does not need to be flat or planar, as it may be concave, convex or shaped otherwise, so long as the resonator remains axi-symmetric. The innermost concentric ring 124 acts as an anchor and attaches resonator 112 to substrate 118 so that the resonator is slightly suspended above the substrate. Resonator 112, including the various concentric rings 120 and anchor 124, may be integrally formed in one resonator body and may be generally coaxial with axis Y.

Figure 6A:
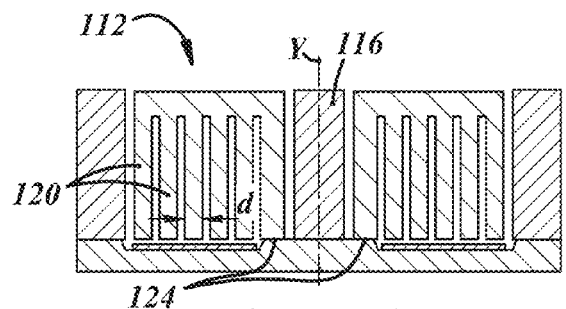
FIG. 6a-6f are cross-sectional views of different resonator embodiments that may be used in the cylindrical gyroscope of FIG. 4.
Figure 6B:
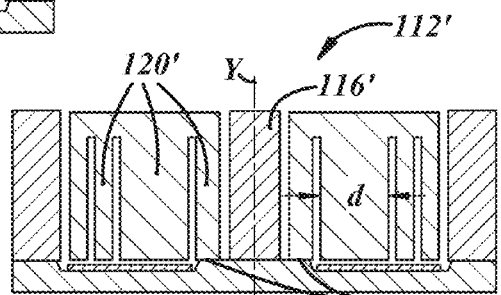
Figure 6C:
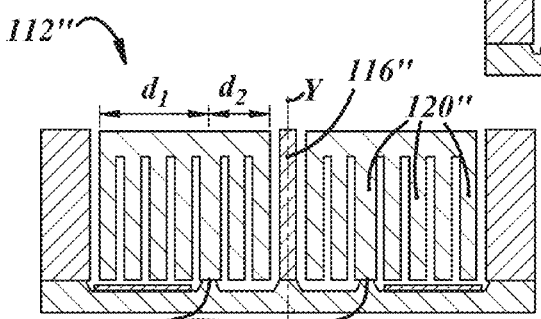
Figure 6D:
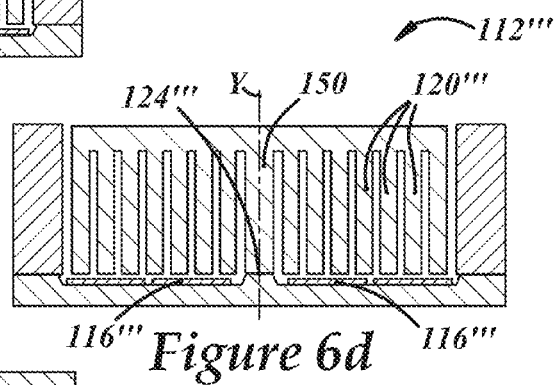
Figure 6E:
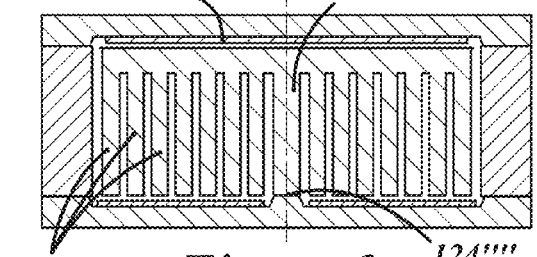
Figure 6F:
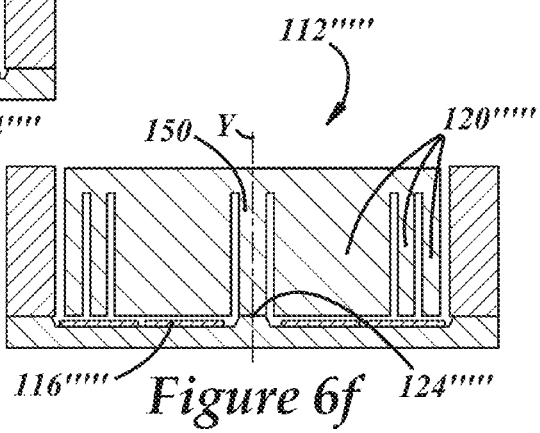

Turning now to FIGS. 6a-6f, there are shown several different possible embodiments for resonator 112. In these embodiments, the thicknesses of the individual concentric rings 120, the location of the anchor portion 124, and the position of the inner electrode 116 (i.e., ring electrode) varies. In FIG. 6a, resonator 112 has concentric rings 120 with the same thickness 'd', an inner ring acting as an anchor 124, and an inner electrode 116 that extends along axis Y. In FIG. 6b, resonator 112' has concentric rings 120' that have non-uniform or differing thicknesses d, an inner ring acting as an anchor 124', and an inner electrode 116' that extends along the Y axis. In FIG. 6c, resonator 112" has concentric rings 120" that are generally uniform in thickness, but have an anchor 124" that is an intermediate ring instead of being the innermost ring; inner electrode 116" extends along axis Y. In FIG. 6d, resonator 112'" has uniform thickness concentric rings 120'", but does not have a standard inner electrode; rather, electrode 116'" has been located underneath some of the concentric rings and a center pole 150 of the resonator now includes anchor 124'". Similarly, FIG. 6e has uniform thickness rings 120"" and an axially extending center pole 150 that includes an anchor 124"", but electrode 116"" has been moved to a location above some of the concentric rings 120"", as opposed to below them. The exemplary embodiment shown in FIG. 6f includes non-uniform concentric rings 120""', an axially extending center pole 150 that has an anchor 124""' at its lower end, and an electrode 116""' located below some of the rings. Center pole 150 may be integrally formed with the resonator, so long as the resonator retains an axi-symmetric configuration. It should be appreciated that the preceding embodiments are only meant to illustrate some potential arrangements and that other configurations and arrangements regarding the resonator, anchor and/or inner electrode are certainly possible.

Outer electrodes 114 electrostatically interact with resonator 112, much in the same way as outer electrodes 14 and resonator 12. According to the exemplary embodiment shown here, outer electrodes 114 include a number of discrete electrode components that are generally arranged around the outer circumference of resonator 112. The discrete electrode components may include one or more drive electrodes, pickup electrodes and/or control electrodes. As explained above, the different outer electrodes 114 may be used in different capacities, depending on the operating mode of the gyroscope (e.g., a rate gyroscope (RG) mode versus a rate-integrating gyroscope (RIG) mode). Thus, specific designations of outer electrodes as drive, pickup and control electrodes have been omitted. Much of the description above—for example, the description pertaining to the number, angular spacing, etc. of outer electrodes 14—is applicable here as well. FIGS. 4 and 5 show an exemplary embodiment of outer electrodes 114 where each of the electrode components is discrete and arranged around the outer circumference of resonator 112. The shape and configuration of outer electrodes 114 is somewhat different than in the previous embodiment; most notably, in that the outer electrodes have an inner surface 160 that faces radially inward and opposes an outer surface of the resonator across thin annular gap 130. Each of the outer electrodes 114 also includes a lower surface 162 that sits on top of substrate 118.

The discrete drive, pickup, and control electrodes which are part of outer electrodes 114 may be fabricated individually, they may be made from a single substrate (e.g., the same substrate as the resonator or a different substrate), or they may be made using bottom electrodes, to cite a few possibilities. The outer electrodes 114 may be electrically connected to a number of electrical leads on substrate 118, including leads 164 which may be located directly underneath the corresponding electrode to which it is connected. Other leads, like lead 166, may electrically connect inner electrode 116 or resonator 112; this is why lead 166 is located in between adjacent outer electrodes 114 instead of being located directly underneath them. Of course, other lead or connector arrangements may be used instead, as gyroscope 110 is not limited to the specific examples disclosed herein.

Inner electrode 116, also referred to as a ring electrode, is optional and may be used to periodically actuate or excite resonator 112 in all radial directions. According to this exemplary embodiment, inner electrode 116 is a cylindrical electrode component that is coaxial with the Y axis and includes an outer surface 170 that opposes resonator 112 across annular gap or space 132. As illustrated in FIGS. 6a-f, the inner electrode does not have to be a cylindrical component extending along the Y axis. Instead, inner electrode 116 may: be located below the resonator (e.g., FIGS. 6d, 6f), located above the resonator (e.g., FIG. 6e), be located within the resonator (not shown), be an annular component (e.g., FIGS. 6d, 6f), be a disk shaped component (e.g., FIG. 6e), radially extend the entire diameter of the resonator (e.g., FIG. 6e), radially extend only a portion of the diameter of the resonator (e.g., FIG. 6d, 6f), or it may be configured according to some other embodiment. Inner electrode 116 is neither required nor is it limited to any one configuration.

Substrate 118 can be made from an insulating material or it may have an insulating layer on its surface, as mentioned above. The substrate may be circular, as it is shown in FIGS. 4 and 5, or it may be provided according to some other shape. Substrate 18 is not limited to any exact shape, thickness, material, etc., and may have various electrical leads or conductors formed on its surface. A potential feature of substrate 118 shown in FIG. 5 is the annular recess 190, which extends around the substrate and is designed to accommodate one more electrical leads located underneath of resonator 112. Substrate 118 may include a single annular recess 190 (as shown in FIG. 5), or it may include several annular recesses that are concentric with each other (as shown in FIG. 6c). Other features and attributes of substrate 118 are certainly possible.

The gyroscope 110 may be attractive or advantageous from several different perspectives: 1) the fabrication process can be quite simple, using conventional deep reactive ion etching (DRIE) technology, and the resonator and electrodes are self-aligned to the anchor, 2) large drive and pickup or sense capacitance for a given sensor footprint to the cylinder shell, 3) out-of-plane rigidity provided by the multiple concentric rings, while still providing low flexural stiffness, and 4) large area bottom electrodes formed by the large cylinder enabled by multiple concentric rings, thus increased capacitance and reduced tuning voltages. Using FEM simulation, with a thickness of 300~500 μm, the wineglass resonance modes can be placed at a frequency of <20 kHz, while the parasitic modes are away from the wineglass mode by >5 kHz. A device of this thickness is viable with conventional DRIE technology, making this gyroscope potential for commercialization.

Figure 7A:
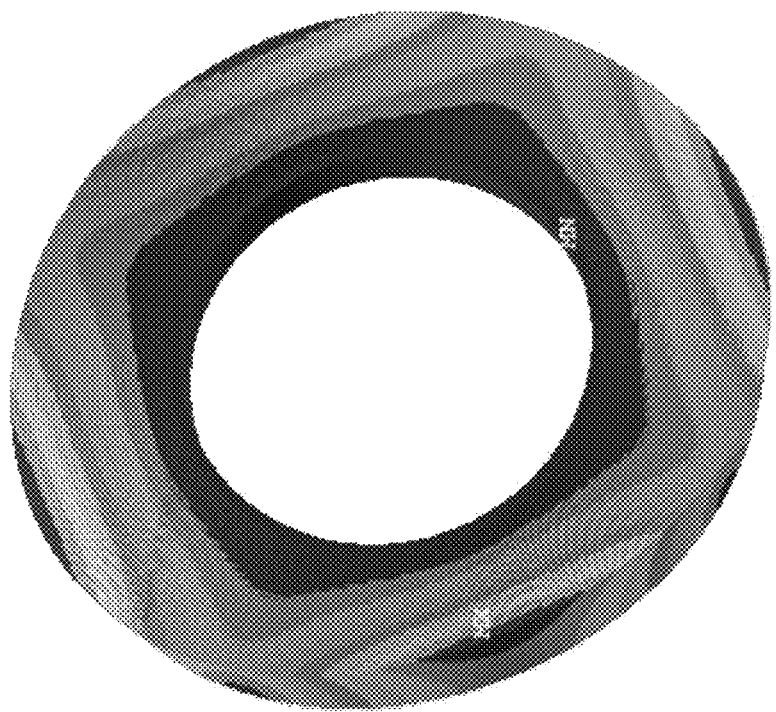

A displacement pattern of the wineglass modes of exemplary gyroscope 110 are illustrated in FIGS. 7a and 7b, with contour patterns indicating the amount of displacement.

Fabrication Process

A number of fabrication methods and techniques may be used to manufacture the different gyroscope components described above, including the exemplary toroidal and multi cylinder embodiments described above. More specifically, resonators 12 and/or 112 may be manufactured using one or more micro-machining techniques, such as those sometimes employed in the semiconductor industry. Some potential examples of suitable micro-machining techniques that may be used to manufacture a resonator include a reflowing process (e.g., glass reverse blowing), a silicon isotropic etching process, a deep reactive ion etching (DRIE) process, or a combination thereof, to name just a few.

One type of micro-machining technique that may be particularly well suited for manufacturing resonators 12 and/or 112 is an exemplary "fused silica flowing" process, which is described below. According to one exemplary embodiment, the fused silica flowing process is a type of reflowing process and is particularly well suited for fabricating resonator 12 of the toroidal gyroscope 10, although the fused silica flowing process may certainly be used to make other resonators and gyroscope components as well. If the fused silica flowing process were used to manufacture resonator 112 of the multi cylinder embodiment, for example, it may be desirable to first employ a conventional DRIE technique followed by fused silica flowing.

To fabricate either a toroidal or wineglass resonator structure and to form drive, pickup, and control electrodes, two exemplary methods are proposed. The first method is based on melting and molding of fused silica (i.e., fused silica flowing process), and the second method is based on precision machining of fused silica or other materials. Melting and molding of fused silica has not been attempted in a micro-scale. The exemplary fused silica flowing process may provide several features: 1) control over the gyroscope's critical dimensions (e.g., radius, depth, anchor size, and shell thickness), 2) ability to integrate all needed electrodes with control over small capacitive gaps; and 3) wafer-level batch process.

Figure 8A:
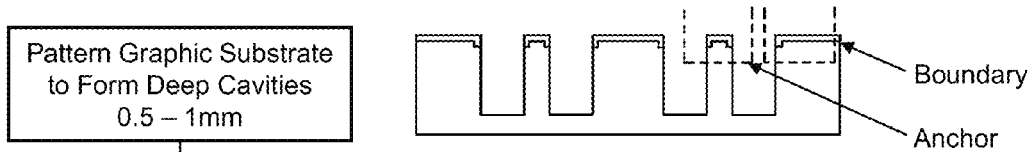
FIGS. 8a-8l depict a fabrication method for making resonators used in the disclosed gyroscope embodiments using a fused silica flowing process.
Figure 8B:
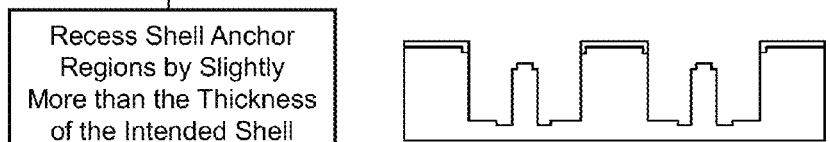
Figure 8C:
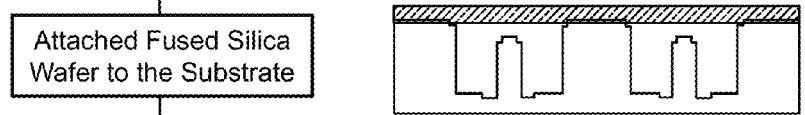

An exemplary embodiment of the fused silica flowing process is shown in FIG. 8, and begins with the definition of deep trenches in a graphite substrate (FIG. 8a). Graphite may be selected for molding fused silica, because it has a TCE ($\alpha_{graphite}$: 0~1.6E-6 $K_{-1}$ for T: 0~1000K) that is closest to that of fused silica ($\alpha_{fusedsilica}$: 0.5E-6~0.6E-6$K_{-1}$ for T: 300~1000K), and because it has a melting temperature much higher than that of fused silica. The graphite substrate may be machined (e.g., using USM or EDM) or etched (electrochemically) to a depth of larger than the intended height of the toroidal gyroscope (100 μm-1 mm). The area where the center anchor of the toroidal gyroscope will be formed is now etched down to a depth of ~150 μm (or slightly larger than the thickness of the final structure) below the surface (FIG. 8b). This step may be important since it allows the toroidal resonator or shell to be self-aligned with the anchor.

Figure 8D:
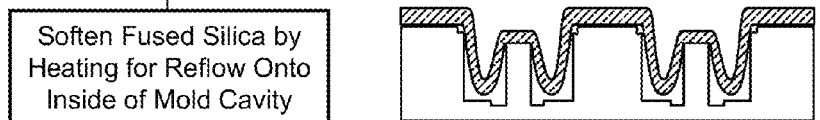
Figure 8E:
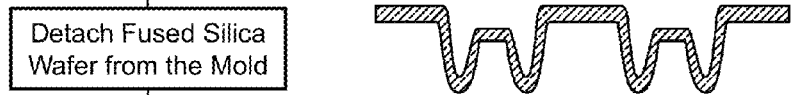
Figure 8F:
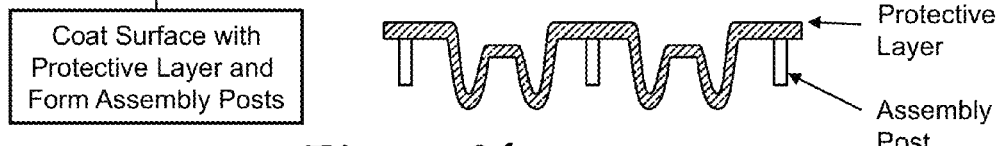
Figure 8G:
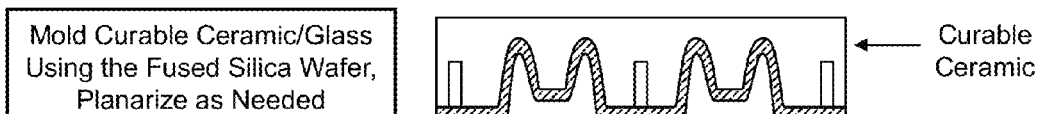
Figure 8H:
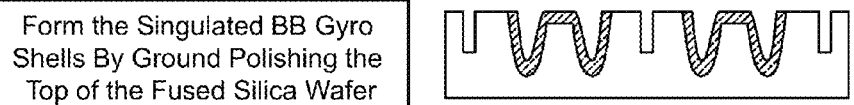
Figure 8H:
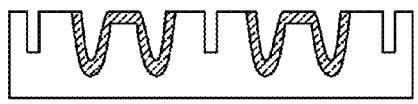
Figure 8I:
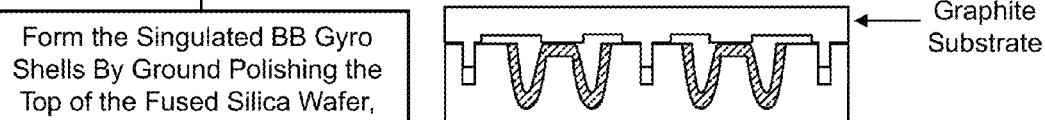
Figure 8J:
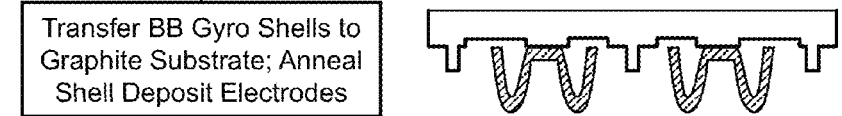
Figure 8J:
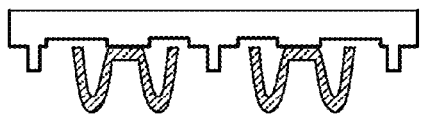
Figure 8K:
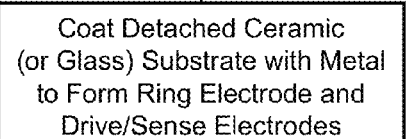
Figure 8K:
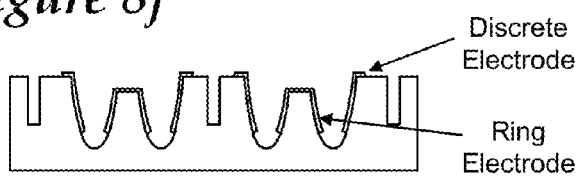
Figure 8L:
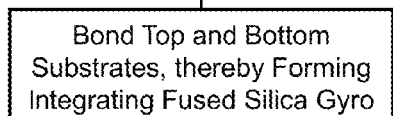
Figure 8L:
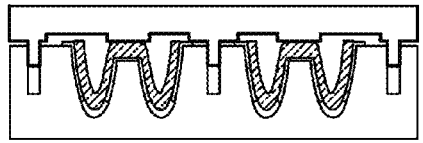

A fused silica wafer is now attached to the graphite wafer (FIG. 8c), and is then softened to take the approximate shape of the graphite mold using a heat and reflow step (FIG. 8d). This heat and reflow step utilizes, but is not limited to, application of high pressure on the top surface of the silica wafer while it is heated to a temperature of ~1600° C. This pressure forces the fused silica to flow into the cavities below. Note that the curvature of the structure is defined by the amount of pressure, temperature and the thickness of silica, not by shape of the walls of the cavity. Note also that a perfect seal between the silica and graphite wafers might not be necessary since a fast pressure pulse could help reform the silica into the desired shape. After molding, the fused silica wafer is separated from the graphite mold by either breaking it away at the few attachment points, or by etching away the graphite substrate (FIG. 8e). After this point in the process the fused silica wafer is processed like any other wafer. A protective film, such as CVD Si, is now deposited conformally on the entire wafer to protect it from any further contamination (FIG. 8f). Guide or alignment posts are defined using electroplating or deposition (FIG. 8f). Then, the fused silica wafer is used as a mold to form a thick solid substrate made from curable ceramic or glass, such as glass frit (FIG. 8g). The top surface of the molded stack is ground by more than the thickness of the gyroscope and polished (FIG. 8h). This defines the toroidal or birdbath (BB) shells or resonators; note that each shell is self-aligned to the support anchor. The toroidal shells are then bonded to a support wafer that is patterned with the pedestal for anchors, and alignment posts that match those on the ceramic/glass substrate (FIG. 8*i*). The shells are now separated from the molded ceramic/glass substrate by sacrificially etching the protective silicon layer (FIG. 8*j*). The shells are then conformally coated with a very thin metal layer through a shadow mask. The detached ceramic/glass substrate is also coated with metal through a shadow mask to form the continuous ring electrode and discrete readout-and-control electrodes (FIG. 8*k*). Finally, the host substrate supporting the toroidal shells, and the ceramic/glass substrates are align-bonded to complete a fully integrated fused silica toroidal gyroscope (FIG. 8*l*). The capacitive gap for the structure is defined by a mechanical spacer that can be formed on either of the two wafers.

The exemplary fused silica flowing process may provide several features: 1) the thickness of the fused silica can be changed easily; 2) the anchor and its shell are self-aligned; 3) the radius and height of the shell can be independently controlled; 4) the fused silica material can be annealed prior to final electrode formation; 5) the capacitive gaps can be as small as 1-2 µm; 6) all needed electrodes are integrated with the shells at the wafer level. The main challenge in this process is the reflow and molding of silica, which may necessitate the use of a high-temperature, high-pressure oven, as the quarts industry has done for decades.

Skilled artisans will appreciate that the exemplary gyroscopes described herein may be integrated or otherwise used with conventional capacitive readout-and-control circuitry and electronics. It is also possible to drive the resonator into resonance or to detect its resonance and motion using other transduction techniques such as piezoelectric transduction. In this case, a piezoelectric material such as AlN, PZT, or ZnO may be deposited on the shell and patterned to form discrete electrodes. These piezoelectric electrodes may have the some configuration (shape and positioning around the resonator) as shown for the illustrated electrodes discussed above, or may be implemented differently. One or more of these piezoelectric electrodes may then be electrically driven to force the resonator into resonance and/or one or more of the them may be used as readout electrodes. Also, piezoelectric transduction of vibration to the resonator may be done by mounting the gyroscope chip (e.g., as shown in FIG. 1) onto a piezoelectric chip that is then driven so as to produce vibratory motion that is transferred to the resonator via the resonator's supporting substrate.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A gyroscope, comprising:
a substrate;
an axi-symmetric mechanical resonator having a center portion, an anchor portion, a first axial side, and a second axial side, wherein the first axial side is opposite the substrate and the second axial side is adjacent the substrate, wherein the resonator has a partially toroidal shape that defines an annular channel along the first axial side and the anchor portion is formed on the second axial side of the resonator;
a plurality of electrodes being located around the resonator; and
a gap being located between the resonator and the plurality of electrodes.

2. A gyroscope as defined in claim 1, wherein the gyroscope is a rate-integrating gyroscope.

3. A gyroscope as defined in claim 1, wherein the gyroscope is a rate gyroscope.

4. A gyroscope as defined in claim 1, wherein the gyroscope further comprises a ring electrode.

5. A gyroscope as defined in claim 1, wherein the gyroscope is on a micro-scale.

6. A gyroscope as defined in claim 1, wherein the frequency of the resonator is less than 500 kHz.

7. A gyroscope as defined in claim 1, wherein the resonator is in the shape of a half ring torus that is open on a first axial side and is closed on a second axial side.

8. A gyroscope, comprising:
a resonator;
a plurality of electrodes being located around the resonator; and
a thin gap being located between the resonator and the plurality of electrodes, wherein the resonator is axi-symmetric and includes a plurality of concentric rings, wherein each concentric ring of the plurality of concentric rings is connected to at least one other concentric ring via an axi-symmetric connecting portion.

9. A gyroscope as defined in claim 8, wherein the gyroscope is a rate-integrating gyroscope.

10. A gyroscope as defined in claim 8, wherein the gyroscope is a rate gyroscope.

11. A gyroscope as defined in claim 8, wherein the gyroscope further comprises a ring electrode.

12. A gyroscope as defined in claim 8, wherein the gyroscope is on a micro-scale.

13. A gyroscope as defined in claim 8, wherein the frequency of the resonator is less than 500 kHz.

14. A gyroscope as defined in claim 8, wherein the resonator is in the shape of a half ring torus that is open on a first axial side and is closed on a second axial side.

15. A gyroscope, comprising:
a substrate;
a resonator having an outer surface that is secured to the substrate; and
a plurality of electrodes including at least one piezoelectric electrode;
wherein the resonator is axi-symmetric and wherein the one or more piezoelectric electrodes are arranged around the outer surface of the resonator and at least partially between the outer surface of the resonator and the substrate to transmit vibratory motion to the resonator, receive vibratory motion from the resonator, or both.

16. A gyroscope as defined in claim 15, wherein the plurality of electrodes include a plurality of piezoelectric electrodes located on the resonator.

17. A gyroscope as defined in claim 15, wherein the gyroscope includes a substrate supporting the resonator and wherein the at least one piezoelectric electrode is a piezoelectric transducer physically coupled to the substrate to impart vibratory motion to the resonator via the substrate.

* * * * *